United States Patent [19]

Maurer

[11] 4,311,220

[45] Jan. 19, 1982

[54] SAFETY CATCH FOR ELEVATORS, LIFTING PLATFORMS, AND THE LIKE

[75] Inventor: Ruprecht Maurer, Bad Homburg, Fed. Rep. of Germany

[73] Assignee: Ringspann Albrecht Maurer K.G., Bad Homburg, Fed. Rep. of Germany

[21] Appl. No.: 86,142

[22] Filed: Oct. 18, 1979

[30] Foreign Application Priority Data

Oct. 18, 1978 [DE] Fed. Rep. of Germany ....... 2845266

[51] Int. Cl.³ .............................................. F16D 59/02

[52] U.S. Cl. ..................................... 188/170; 188/188

[58] Field of Search ....................... 188/170, 188, 265; 303/89

[56] References Cited

U.S. PATENT DOCUMENTS

| | | | |
|---|---|---|---|
| 2,851,995 | 9/1958 | Westcott | 188/170 X |
| 3,203,513 | 8/1965 | Allen | 188/170 |
| 3,918,346 | 11/1975 | Ziegler | 188/170 X |

*Primary Examiner*—Duane A. Reger

*Attorney, Agent, or Firm*—Spencer & Kaye

[57] ABSTRACT

A safety catch device for elevators, lifting platforms and the like in which a load bearing rod passing through the safety catch is clamped in by means of a plurality of series connected conical clamping discs which are acted upon by disc springs via an axially displaceable pressure ring in a direction to effect clamping of the rod.

21 Claims, 5 Drawing Figures

SAFETY CATCH FOR ELEVATORS, LIFTING PLATFORMS, AND THE LIKE

BACKGROUND OF THE INVENTION

The present invention relates to a safety catch device for blocking movement of a rod relative to a component of a mechanism with respect to which the rod is normally movable, which device includes clamping means surrounding the rod, and a compression spring disposed to produce a force which acts on the clamping means to clamp the latter against the rod, the clamping means being releasable from the rod clamping position against the action of the compression spring.

In a prior art safety device of this type, such as disclosed in German Pat. No. 2,333,491, clamping bodies in the form of a plurality of brake jaws are disposed adjacent one another in the circumferential direction and surround the rod in the form of circular sectors. On their side adjacent the jaw they have a partially cylindrical inner face which is matched to the diameter of the rod. At their opposing outer side they each have a conical shape and are axially displaceably mounted in a housing ring having a corresponding inner cone. Since the conical faces of the brake jaws of the housing ring fit together without leaving gaps only when in a single position, when there is congruence of their diameters, while in another, lower or higher, position of the brake jaws there result stresses on the edges with unduly high compressive pressures, the brake jaws must each be provided with guide faces which are inclined so as to correspond to their conicity but are planar in the circumferential direction and move over a needle cage at an identical guide face in the inner cone of a housing ring. These guide faces must be manufactured with extreme precision so that surface contact is produced between the brake jaws and the rod.

Due to the conical faces at the brake jaws and the housing ring, and particularly due to the oblique but inherently planar guide paths along the conical faces, the manufacture of these prior art safety catches is rather expensive. Moreover, there does not exist a defined setting force which keeps the brake jaws out of contact with the rod when they are not in the clamping position. Finally, because of the required longitudinal gaps between the individual brake jaws it is very difficult to exert an axially symmetrical clamping pressure, which is a prerequisite for uniform gentle treatment of the friction partners.

Although German utility model Pat. No. 1,895,972 discloses a structure which eliminates the structurally complicated guide paths in the conical faces, the above-mentioned surface pressure conditions and, in addition, considerable friction forces are unavoidably encountered during axial displacement of the brake jaws. The high manufacturing costs for the conical parts remain the same.

Finally, German Auslegeschrift [Published Application] No. 1,180,921 discloses a safety or clamping device for hydraulic or pneumatic lifting platforms. This device includes a resilient, conical clamping ring which encloses the lifting column and is enclosed, through the intermediary of a resiliently supported ball cage, by a clamping bell. A clamped position of the conical part can be realized with one manual setting. This apparatus is also relatively complicated structurally and, in addition, can be integrated into existing lifting systems only with difficulty since it occupies a relatively large space. Moreover, it permits only slight clamping forces to be applied.

SUMMARY OF THE INVENTION

It is an object of the present invention to improve safety catch devices of the type disclosed in German Pat. No. 2,333,491 in a manner to reduce their manufacturing costs and provide a completely axially symmetrical clamping effect with large area contact of the clamping elements.

This and other objects are achieved according to the invention in a device of the type disclosed at the outset, by constituting the clamping means by a plurality of conical clamping discs provided with a central opening through which the rod passes, and further providing the device with a support member which is substantially stationary relative to the mechanism component and axially supports the clamping means at one end thereof, and an axially movable member, or pressure ring, axially supporting the clamping means at the other end thereof and disposed for transmitting the force produced by the spring to the clamping means. The clamping means are possibly hydraulically releasable from the rod clamping position.

The solution according to the present invention makes unnecessary the structurally complicated conical faces and, instead of circular sector-shaped brake jaws, enables more economical mass produced parts to be used. Moreover, the present invention results in a large-area and completely axially symmetrical contact pressure since the clamping discs extend over the entire circumference of the rod.

Clamping discs of the type employed in the practice of the present invention are all conical discs which, when pressed flat out of their undeformed state, produce a reduction in the diameter of their inner periphery. Particularly suitable are clamping discs in the form of disc springs, which may be provided with radial slots extending from their inner periphery, or with radial slots extending alternatingly from their inner periphery and outer periphery, highly suitable elements being conical discs sold under the trademark RINGSPANN.

The use of slotted clamping discs provides a way to combine a plurality of clamping discs in a known manner into a packet which is then ground to the desired inner diameter. Thus it is assured with a maximum degree of precision that all clamping discs will take part uniformly in the clamping process.

Since, in one axial direction, the outer peripheral region of the packet of clamping discs projects axially, while in the other axial direction, the inner peripheral region projects axially, the movable member, or pressure ring, can axially introduce the clamping disc flattening force either at the inner or outer periphery of the clamping discs, depending on the direction in which the clamping discs are installed. If the movable member acts on the outer peripheral region on the clamping disc adjacent thereto, there is created the advantage that the pressing flat of the clamping discs does not result in carrying along the rod because the inner edges of the clamping discs retain their axial position and are merely compressed radially.

Particularly with clamping discs which have also been given slots extending from their outer periphery in order to reduce the inverting, or flattening, force, it is preferable to further provide a cylindrical sleeve element surrounding and radially supporting the clamping discs. This sleeve may be made radially flexible so that it is subjected to a widening process. This widening can also be supported by selecting a narrow wall thickness and a spring steel which has a high yield strength to permit the clamping discs to become flatter and to eventually be pressed flat completely. In this case the sleeve member itself acts as an annular spring and the clamping discs can be made weaker so that they expand radially outwardly to a greater extent. This makes the translation ratio between their axial actuation force and their radial braking, or clamping, force more favorable.

The sleeve may be formed by the housing or by parts of the housing. Usually, however, it will be most favorable to make the sleeve element integral with the movable member, or pressure ring.

According to a further feature of the invention, provision of a radially elastic sleeve element between the clamping discs and the rod, which element is preferably supported against axial movement relative to the support member, is recommended to permit radial clamping movement of the clamping discs independently of the load and movement conditions of the load bearing rod. Then the sleeve element can guide the axial holding forces directly from the rod into the housing of the safety catch device and thereby permits radial clamping movement of the clamping discs without interference.

If the rod is subjected to a load which can change direction, the sleeve element can be fixed to be non-displaceable in both axial direction so that the holding forces can be transmitted into the housing of the safety catch device independently of the direction of the load.

The axial fixing of the sleeve element has the further advantage that the safety catch device can be released at any time without having to displace the rod a small amount against the direction of the load. This advantage is of particular significance for liftable tables or for orchestra stages.

Finally the arrangement of a radially elastic sleeve element between the clamping discs and the rod has the advantage that instead of the relatively high local edge pressure along the inner periphery of each individual clamping disc, a much more uniform surface pressure with lower pressure peaks is applied to the surface of the rod.

On the other hand, it is possible to mount the sleeve element so that it is axially displaceable in the clamping direction and this displacement in the clamping direction may additionally also be conveyed to the pressure ring. This arrangement can prove advantageous particularly if the direction of the load in the rod is such that it tends to act on the conical clamping discs in the direction to press them flat. With this arrangement, the greater the load on the rod, the more the clamping discs are axially compressed and the greater will be the radial clamping force which the clamping discs exert on the rod. The force on the rod thus produces an automatic reinforcement of the radial clamping force of the clamping discs.

If the clamping discs are selected which have a small angle of inclination when unstressed, for example less that 620, there will occur self-inhibition. The rod can then no longer be pushed through the clamping unit even under extremely high stress and the force of the compression spring which presses the clamping discs into their clamped position is of no significance whatsoever.

A sleeve element will also be advisable if a coating to increase the coefficient of friction is to be used between the clamping discs and the rod. This coating can then be placed on the sleeve element to create a friction bearing.

If use is made of a sleeve element which is closed in the circumferential direction, the desired radial elasticity can be realized by suitable material selection and choice of wall thickness. However, it is preferable to utilize a sleeve element which is axially slotted. This may include a plurality of axial slits which emanate from a common collar on the sleeve.

If a safety catch device according to the invention is used for hydraulically operated lifting devices, the movable member can be constituted by a piston and the device can further include means for applying the hydraulic pressure driving the mechanism to the piston for moving the piston in opposition to the force produced by the compresssion spring to thereby prevent the clamping means from clamping the rod. With every drop in pressure in the hydraulic system this embodiment will automatically cause clamping. It is, however, also possible to release the clamping discs from their clamping position not hydraulically but mechanically, for example, by the provision of mechanical actuation means, such as a push-away screw which acts axially on the pressure ring, for moving the clamping means out of their rod-clamping position.

Various designs are available for releasing the clamping effect mechanically. For example, the mechanical actuation can be effected by a pivot lever which is mounted in the housing of the safety catch and which acts axially on the pressure ring via suitable ramps or an eccentric.

If particularly high blocking forces must be exerted, two safety catch devices can be mounted on the rod in axial symmetry to one another. In this case twice the holding force is obtained with a relatively low increase in housing dimensions. If the compression springs are disposed in the vicinity of the axial extremities of the assembly, and the clamping discs are located between the springs, it is sufficient to provide a common actuating device to release all clamping discs from their clamping positions. If the rod is associated with a hydraulically operated lifting device, then each safety catch device can be constructed, as described above, to be prevented from performing a clamping action by the hydraulic pressure, so that only one pressure medium connection need be provided for both safety catch devices. Similarly, if the two safety catch devices are to be moved out of their rod clamping position by mechanical actuating means, only one mechanical actuating member need be provided for the two devices. But it is just as possible to arranged the compression springs to the inside and the clamping discs to the outside. The mechanism associated with a safety catch device according to the invention can include a piston-cylinder unit the piston of which is fastened to the rod, and the device can further include a housing supporting the movable member and provided with a flange attachable to the cylinder of such unit. Alternatively, the device can further include a housing supporting the movable member, an axial jacket cylinder carried by the housing, a first mounting eye fastened to the cylinder, and a second mounting eye fastened to the rod. This latter embodiment permits the safety catch device to be used as a support in the manner of a hydraulic cylinder between two points of a joint.

DESCRIPTION OF THE PREFERRED EMBODIMENTS

Figure 1:
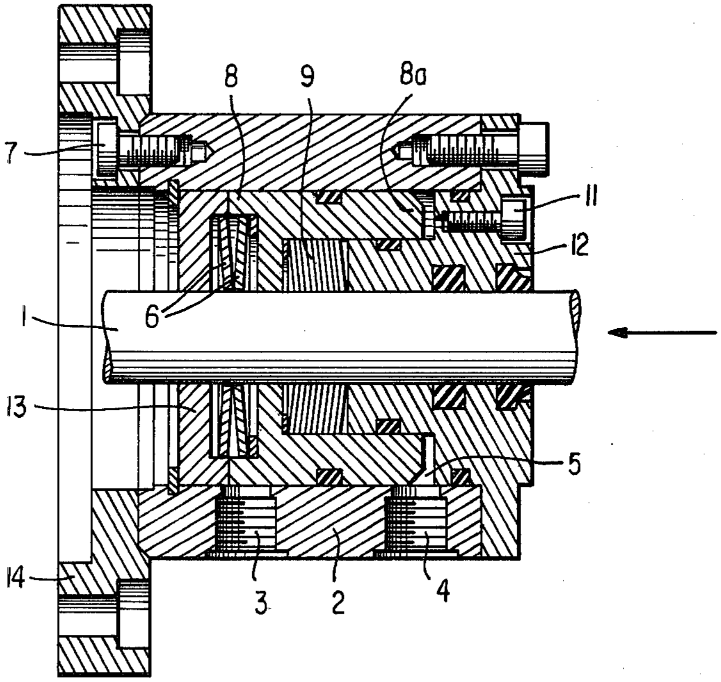
FIG. 1 is an axial, cross-sectional view of a first preferred embodiment of the invention for attachment to a hydraulic cylinder.

In FIG. 1 there is shown a load-bearing rod 1 which performs a lifting movement and a housing 2 which is fastened, via a flange 14 fastened thereto, to a lifting cylinder (not shown) or other stationary component. Of course the movement relationships between rod 1 and such component can also be reversed. A catch device according to the invention is disposed in housing 2.

The housing 2 has the form of a hollow cylinder which is closed at both ends by respective housing covers 12 and 13. Both covers are provided at their centers with opensings for the passage of rod 1, sealing rings being provided, depending on the particular requirements, as shown, by way of an example, at housing cover 12. In the illustrated structure, cover 12 is bolted to housing 2 while cover 13 is secured in place by a retaining ring.

The left-hand housing cover 13 serves as an abutment for a compression spring in the form of two oppositely oriented disc springs 6. These disc springs 6 are pressed against a pressure piston 8 which is guided to be axially displaceable in the cylindrical housing 2. Piston 8 transfers the pressure force produced by the two disc springs 6 to a packet formed by a plurality of clamping discs 9 arranged one behind the other and each having the approximate shape of a disc spring but preferably being provided with radial slots extending alternatingly from the inner periphery and the outer periphery of the disc to reduce its resistance to deformation.

As shown clearly in FIG. 1 the axial force generated by the disc springs 6 is applied to the outer periphery of the packet of clamping discs 9 which, on the other hand, is supported along its inner periphery by the housing cover 12. The pressure piston 8 has an axial projection in the form of a hollow cylinder 8*a*. This projection assures, on the one hand, precise guidance of the pressure piston in the cylindrical housing and, on the other hand, the inner cylindrical face of projection 8*a* serves to radially support the clamping discs 9. Thus discs 9 need not themselves absorb at their outer circumference the radial reaction forces generated during compression and can consequently be made more elastic. Thus a lower axial inverting force is sufficient to attain a given radial compression of the clamping discs against rod 1.

In the illustrated embodiment, the pressure piston 8 is shown in its left-hand end position, which is defined by an axial projection of the housing cover 13. The clamping discs 9 are then wholly or partially relaxed, and thus exert substantially no clamping force on rod 1. In order to keep the pressure piston in this position in spite of the counterforce exerted by the disc springs 6, a hydraulically or mechanically generated supporting force must be applied to the pressure piston.

In the illustrated embodiment this supporting force is generated hydraulically in that the cylindrical space 5 disposed between the pressure piston 8 and the housing cover 12 is connected via a connecting bore 4 to a pressure medium circuit, preferably the same circuit in which circulates the pressure medium for the lifting device. If the pressure medium has the prescribed pressure, it presses the piston 8 into the illustrated end position so that the rod 1 is freely movable.

If, however, due to a malfunction, for example a break in a hose, there is a loss in pressure, the force of the disc springs 6 predominates over the counter pressure in cylinder chamber 5 and displaces the piston 8 into the clamping position. Since the piston 8 initiates application of the axial force at the outer periphery of the clamping discs 9, and these discs are supported via their inner periphery at the housing cover 12, it is assured that the partial flattening of the clamping discs 9 required for clamping will not lead to axial displacement of the inner periphery of the clamping discs. Rod 1 is thus clamped in place in the position which it had relative to housing 2 when the clamping force was applied.

The catch device is generally so installed that the load pressure on rod 1 urges the rod in the direction to press flat the clamping discs 9, i.e. in the direction of the arrow in the drawing. This has the advantage that during clamping of the rod, the direction in which the rod is being urged will create a self-inhibition effect with the clamping discs and extremely high blocking forces can be built up. The blocking forces can here attain values having an axial component substantially above the axial contact pressure force on the disc spring 6 so that the pressure piston 8 will be shifted, as a result of the load pressure on rod 1, back into its end position shown in FIG. 1. The hollow cylinder 8*a* can then itself take on the function of an elastic annular spring which can be deflected radially outwardly. For this purpose, cylinder 8*a* is dimensioned, particularly with regard to its wall thickness, to be pressed outwardly under the radial force generated by the axially compressed clamping discs so that the clamping discs can expand radially. When the clamping discs are pressed flat, they produce a radial force which is transmitted to cylinder 8*a* which acts as an annular spring applying a clamping force to housing 2 as well as to rod 1. The clamping force is here limited to a permissible maximum value and the clamping discs are protected against overloads by appropriate dimensioning of the various components. Of course, care must be taken with this design to reduce the outer diameter of cylinder 8*a* in the region participating in the widening process to the extent that it cannot jam in the housing 2. To accomplish this, it is only necessary to provide the outer circumferential region of the cylinder 8*a* opposite the clamping discs with a groove; outside of this groove the cylindrical guide faces remain available in the housing for guiding the axial displacement of the piston 8.

A connecting bore 3 in the housing 2 serves merely the purpose of returning any oil which has leaked from the cylinder chamber 5 past the clamping discs and the disc springs back to the oil supply.

Finally, in the embodiment of FIG. 1 mechanical release of the clamp can be effected by replacing the locking screws 11 by longer press-away screws having the same threading so that the piston 8 can also be displaced against the force of the disc springs 6 to release the clamp. This possibility will apply mainly when the pressure assembly is malfunctioning for long periods of time. If, however, it is intended in principle to operate only with mechanical releases, the locking screws 11 can be replaced by a plurality of pressure pins inserted into matching bores in the housing cover 12 so that their inner ends engage at the pressure piston 8. Their outer ends may abut, for example, at a control cam. This control cam is mounted on the housing cover to be rotatable coaxially relative to the rod 1 and is provided with an obliquely ascending ramp when seen in the circumferential direction where it contacts the pressure pins. Consequently, rotation of the control cam produces an axial displacement of the pressure pins so that the pressure piston 8 can be shifted to the left out of the clamped position. The safety catch cannot release itself as long as it carries a load acting in the direction of the arrow in FIG. 1. This disadvantage can be avoided by inserting a sleeve between the piston rod and the clamping discs in the manner shown in FIG. 2.

Figure 2:
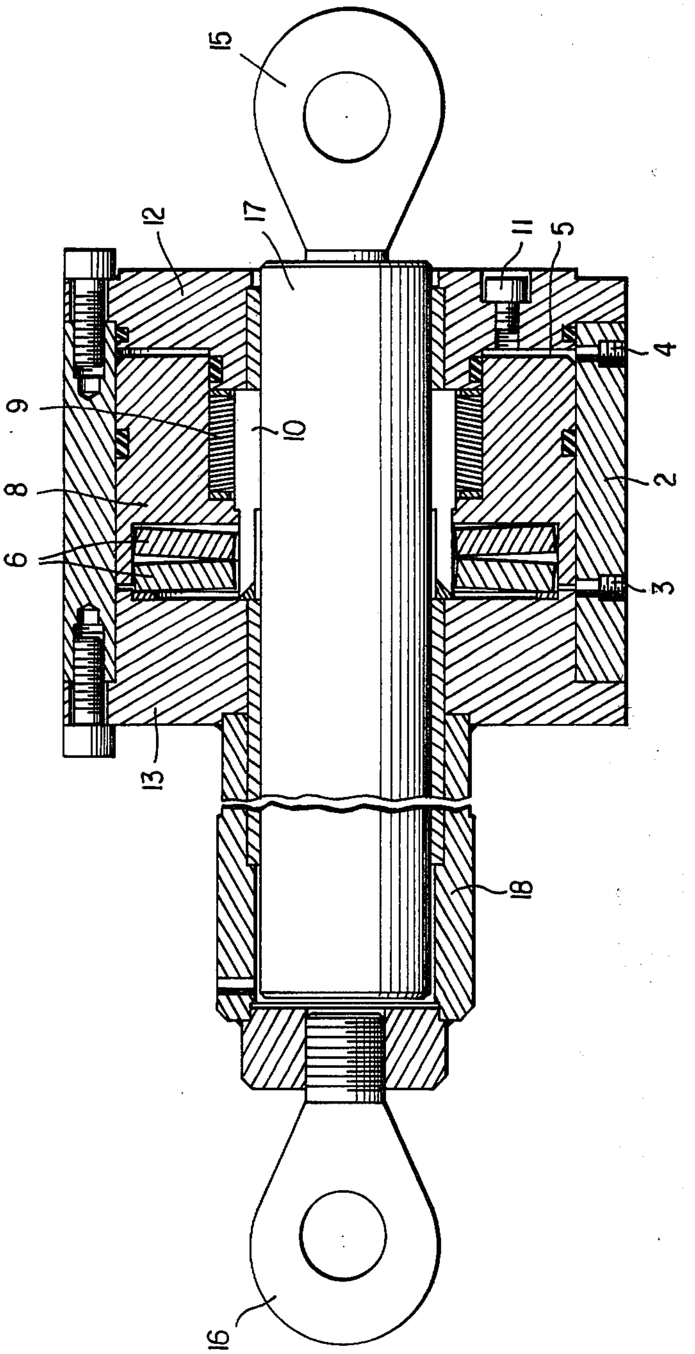
FIG. 2 is an axial, cross-sectional view of an embodiment similar to that of FIG. 1 for attachment to supports.
Figure 4:
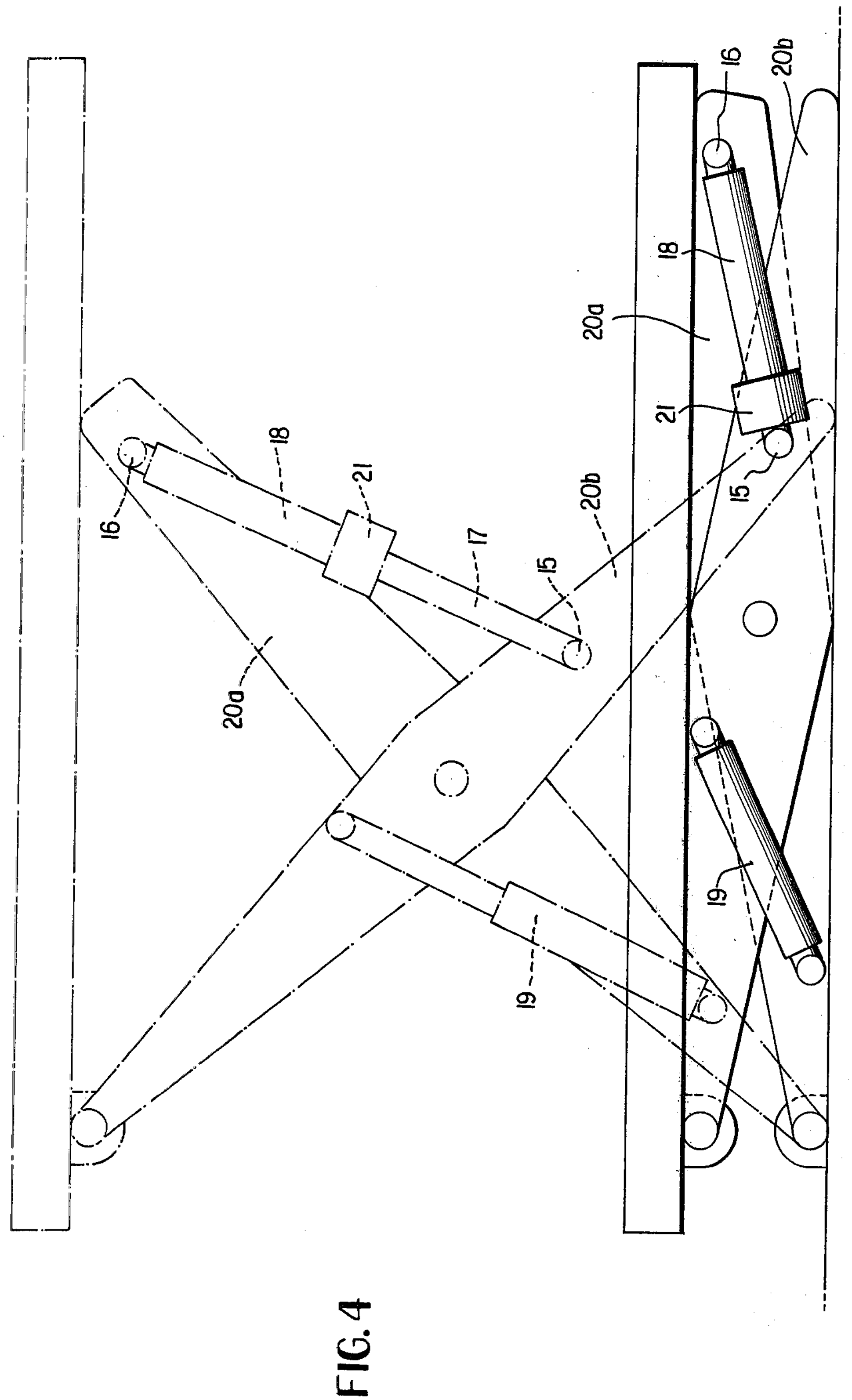
FIG. 4 is a schematic, elevational view illustrating use of an embodiment of the invention as a support.

FIG. 2 shows basically the same catch device as FIG. 1. Corresponding parts, therefore, bear the same reference numerals. The significant difference is firstly that this device is not provided to be directly attached to a hydraulic cylinder, as is possible in FIG. 1 by means of flange 14, but instead the catch device is installed in a separate support composed of a load-bearing piston 17 and a supporting cylinder 18. The free ends of the piston and the cylinder are fastened to respective eyes 15 or 16 enabling the device to be installed in the manner of a hydraulic cylinder between two supporting carriers. FIG. 4, which will be discussed in detail below, shows such a use.

The second difference from FIG. 1 is that the clamping discs 9 are not seated directly on the rod, or piston, 17, but instead an intermediate member is provided in the form of an axially slotted, cylindrical sleeve 10. This sleeve is held against axial displacement relative to cylinder 2 by the two housing covers 12 and 13 and is provided at its inner surface with a coating to increase its coefficient of friction with piston 17.

Figure 3:
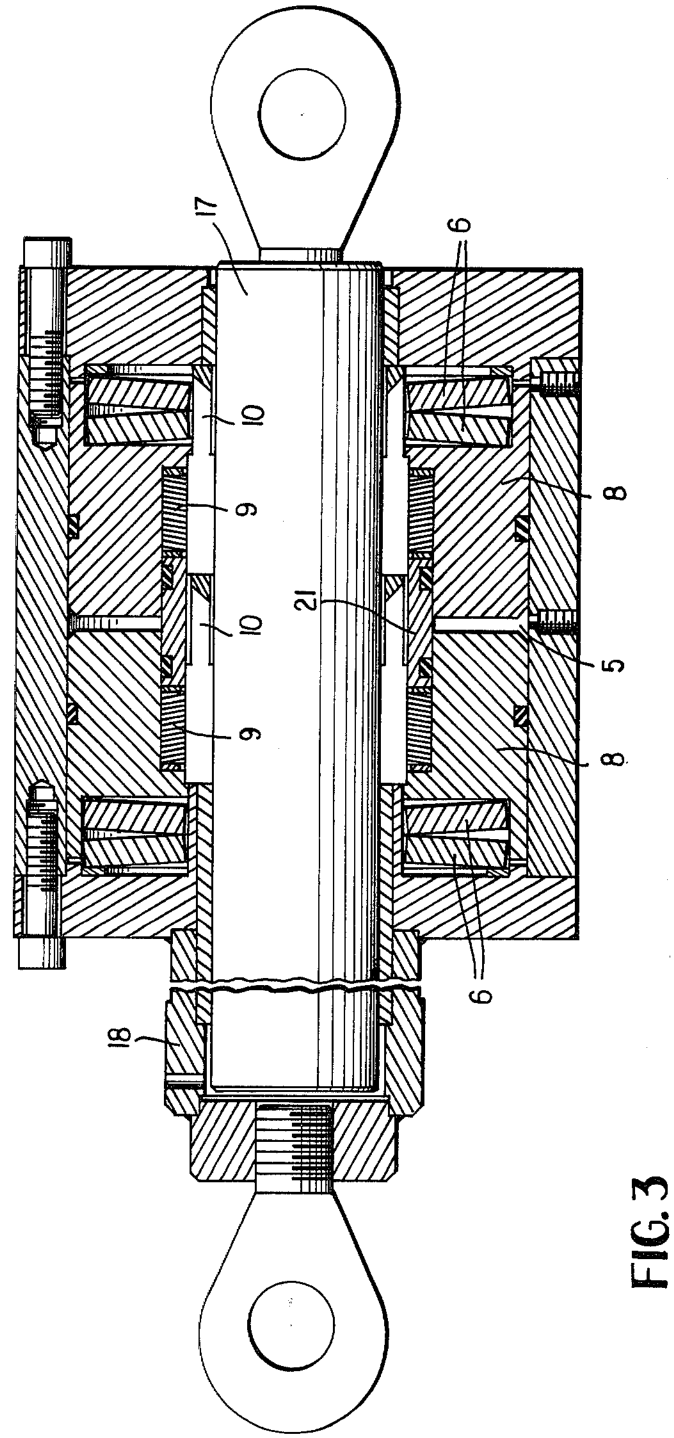
FIG. 3 is an axial, cross-sectional view illustrating a further embodiment of the invention having two of the catch devices shown in FIG. 2.

In the embodiment shown in FIG. 3, two devices having the form shown in FIG. 2 are combined to double the clamping force. The combination is effected structurally in that the two devices are disposed in a mirror image arrangement relative to the cylinder chamber 5. Thus only a single common cylinder chamber is required for the two pressure pistons 8, the physical space required is a minimum, and the radial surface pressure on piston rod 17 is the same as when one device is provided. Corresponding parts here also bear the same reference numerals. The packets of clamping discs 9 are axially supported adjacent their inner peripheries by means of a sleeve member 21 which is interposed between the two packets and in that way constitutes a practically stationary member.

FIG. 4 shows the installation of a device having the form shown in FIG. 2 or 3 in a lifting table. The solid lines here show the lower, collapsed, position and the dot-dash lines the upper, extended, position of the table. Raising of the table top is effected by known lifting cylinders 19 which act on a conventional scissors-type frame 20 composed of two scissors elements **20*a* and 20*b* between which there is connected a device 21 according to the invention which is articulated to the scissors elements by means of its piston rod 17 and supporting cylinder 18 via eyes 15 and 16**, respectively.

The device or devices are each connected to the hydraulic system of the lifting cylinders 19 so that if there is a loss of pressure, the table top is automatically blocked in the extended lifted position, or in whatever position it has.

Figure 5:
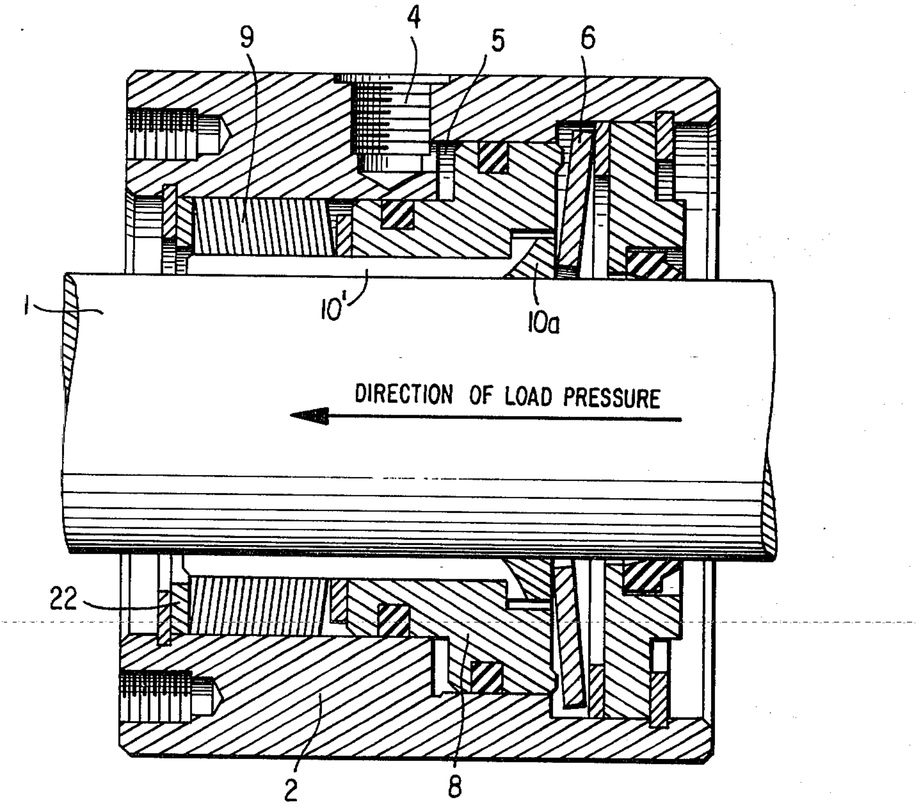
FIG. 5 is an axial, cross-sectional view of another embodiment of the invention which operates with self-inhibition.

FIG. 5 shows an embodiment of the invention which is distinguished by the fact that it operates with self-inhibition. In its basic structure, this device corresponds to that shown in FIG. 1. Corresponding parts therefore bear the same reference numerals. In this case, however, the packet of clamping discs 9 is axially supported in the region of its inner periphery against the pressure piston 8 and in the region of its outer periphery against a ring 22 which abuts the housing 2 and effectively forms a part thereof. Its significant difference with respect to FIG. 1 involves the provision of a sleeve 10' which is interposed between the clamping discs 9 and the load-bearing rod 1. In contradistinction to the embodiments of FIGS. 2 and 3, the sleeve 10' however is not supported against the housing but can be carried along for a bit in the axial direction by the rod 1.

This arrangement has the following advantage; if the load on rod 1 acts in the direction of the arrow, which corresponds to pressing the clamping discs 9 flat, the inclination assumed by the clamping discs 9 will cause the load on rod 1 to augment the radial force generated by the clamping discs 9. Thus, due to this self-augmenting effect a smaller spring 6 can be used and therefore the entire clamping unit can be made smaller. If the inclination is selected to be sufficiently small there will occur self-inhibition. The resulting blocking forces will then be independent of the pressure force of spring 6. Self-inhibition takes place if the load of the rod 1 itself induces a pressing flat-action of the clamping discs 9, which is higher than or equal to the pressing flat action necessary to hold the load. In this case, the disc spring has no other purpose but to provide, in the beginning of the clamping action, a secure contact between sleeve 10 and rod 1. This contact is necessary to initiate the process of self-inhibition.

In order to give the sleeve 10' sufficient play in the axial direction, as required for self-inhibition, without it being capable of being pushed out of the safety device, no axial support is provided for the sleeve against movement in the direction of the arrow. In order to translate the axial friction forces between rod and sleeve which produce the self-augmenting effect, to the clamping discs, the sleeve is supported by the pressure piston 8 via a radially protruding collar **10*a*. This enhances the initiation of the clamping process since the pressing flat of the clamping discs 9 does not depend on the friction between the sleeve and the clamping discs but is effected in a form-locking manner via the collar 10*a* and the pressure piston 8**.

Because of the high self-augmenting forces realizable with this design, it is here sufficient to provide only a single disc spring 6 which biasses the pressure piston 8 in the clamping direction. Clamping disks, which are suitable for use in this safety catch, are shown, for example, in the German Pat. No. 1005324.

It will be understood that the above description of the present invention is susceptible to various modifications, changes and adaptations, and the same are intended to be comprehended within the meaning and range of equivalents of the appended claims.

What is claimed is:

1. In a safety catch device for blocking movement of a rod relative to a component of a mechanism with respect to which the rod is normally movable, which device includes clamping means surrounding the rod, and a compression spring disposed to produce a force which acts on the clamping means to clamp the latter against the rod, the clamping means being releasable from the rod clamping position against the action of the compression spring, the improvement wherein said clamping means are constituted by a plurality of conical clamping discs combined into a packet extending along the axis of the rod and provided with a central opening through which the rod passes, and said device further comprises a support member which is substantially stationary relative to the mechanism component and axially supports said clamping means at one end thereof, and an axially movable member axially supporting said clamping means at the other end thereof and disposed for transmitting the force produced by said spring to said clamping means in the axial direction of the rod for at least partially flattening said discs for producing a radial clamping force between said discs and the rod.

2. A device as defined in claim 1 wherein said clamping means are hydraulically releasable from the rod clamping position.

3. A device as defined in claim 1 wherein said clamping discs are disc springs.

4. A device as defined in claim 1 wherein said clamping discs are provided with radial slots extending from their inner periphery.

5. A device as defined in claim 1 wherein said clamping discs are provided with radial slots extending alternatingly from their inner periphery and outer periphery.

6. A device as defined in claim 1 wherein one of said members contacts the region of the inner periphery of that clamping disc adjacent thereto and the other of said members contacts the region of the outer periphery of that clamping disc adjacent thereto.

7. A device as defined in claim 1 further comprising a cylindrical sleeve element radially supporting said clamping discs.

8. A device as defined in claim 7 wherein said sleeve element is radially flexible.

9. A device as defined in claim 7 or 8 wherein said sleeve element is integral with said movable member.

10. A device as defined in claim 1 further comprising a radially elastic sleeve element interposed between said clamping discs and the rod.

11. A device as defined in claim 10 wherein said sleeve element is supported against axial movement relative to said support member.

12. A device as defined in claim 10 wherein said sleeve element is axially displaceable relative to said support member in the direction of the force produced by said compression spring.

13. A device as defined in claim 12 wherein said sleeve element is provided with an abutment portion disposed to transmit to said movable member displacements of said sleeve element in the direction of the force produced by said compression spring.

14. A device as defined in claim 10, 11, 12 or 13 wherein said sleeve element is provided with a friction bearing at its surfce facing the rod.

15. A device as defined in claim 10, 11, 12 or 13 wherein said sleeve element is axially slotted.

16. A device as defined in claim 1 wherein the mechanism is hydraulically driven, said movable member is constituted by a piston and said device further comprises means for applying the hydraulic pressure driving the mechanism to said piston for moving said piston in opposition to the force produced by said compression spring to thereby prevent said clamping means from clamping the rod.

17. A device as defined in claim 1 or 16 further comprising mechanical actuation means for moving said clamping means out of their rod clamping position.

18. A device as defined in claim 17 wherein said mechanical actuation means comprise a push-away screw which acts axially on said movable member.

19. A safety catch assembly comprising two identical safety catch devices each as defined in claim 1 mounted on said rod axially symmetrically to one another.

20. A device as defined in claim 1 wherein the mechanism includes a piston-cylinder unit the piston of which is fastened to the rod and wherein said device further comprises a housing supporting said movable member and provided with a flange attachable to the cylinder of such unit.

21. A device as defined in claim 1 further comprising a housing supporting said movable member, an axial jacket cylinder carried by said housing, a first mounting eye fastened to said cylinder, and a second mounting eye fastened to the rod.

* * * * *